United States Patent
Hong et al.

(10) Patent No.: US 7,555,152 B2
(45) Date of Patent: Jun. 30, 2009

(54) SYSTEM AND METHOD FOR DETECTING GROUND GLASS NODULES IN MEDICAL IMAGES

(75) Inventors: Lin Hong, Monmouth Junction, NJ (US); Yumao Lu, Santa Clara, CA (US); Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 652 days.

(21) Appl. No.: 11/324,503

(22) Filed: Jan. 3, 2006

(65) Prior Publication Data

US 2006/0153451 A1  Jul. 13, 2006

Related U.S. Application Data

(60) Provisional application No. 60/641,789, filed on Jan. 6, 2005, provisional application No. 60/725,944, filed on Oct. 12, 2005, provisional application No. 60/728,158, filed on Oct. 19, 2005.

(51) Int. Cl.
*G06K 9/00* (2006.01)
*A61K 39/00* (2006.01)

(52) U.S. Cl. ............... 382/128; 382/173; 424/277.1

(58) Field of Classification Search ............ 382/128, 382/129, 130, 131, 132, 133, 134, 164, 171, 382/173, 179, 260; 600/407, 410, 411, 425, 600/433, 533, 538; 424/138.1, 141.1, 155.1, 424/174.1, 277.1, 557, 573; 607/901; 423/154.4
See application file for complete search history.

(56) References Cited

U.S. PATENT DOCUMENTS 6,937,776 B2 *  8/2005  Li et al. .................. 382/260

7,209,581 B2 *  4/2007  Zhang et al. ............. 382/131

OTHER PUBLICATIONS

Zhang Li et al., "Consistent Interactive Segmentation of Pulmonary Ground Glass Nodules Identified in CT Studies," Proceedings of the SPIE (2004) 5370, pp. 1709-1719.
Leemput, Koen Van et al., "Automated Segmentation of Multiple Sclerosis Lesions by Model Outlier Detection," IEEE Transactions Medical Imaging, (2001) 20:8 p. 677.
Fan I et al., "Automated Detection of Lung Nodules From Multi-Slice Low-Dose CT Images," Proceedings of the SPIE (2001) 4322 pp. 1828-1835.
International Search Report.

* cited by examiner

*Primary Examiner*—Abolfazl Tabatabai

(57) ABSTRACT

Detecting ground glass nodules in medical images includes calculating a probability distribution function of background lung tissue in a chest image, estimating a variation range of the background tissue probability distribution function, estimating a probability distribution function of an image point belonging to a ground glass nodule from the variation range of the background tissue probability distribution function by using a function corresponding to the variation range of the background tissue probability distribution function, and calculating a log likelihood function of the image from the background tissue probability distribution function and the estimated ground glass nodule probability distribution function, wherein the log likelihood function represents the confidence that a point in the image is not part of a ground glass nodule. The log likelihood function value for each point is compared to a confidence value of the background tissue, to determine if the point is a candidate ground glass nodule location.

23 Claims, 10 Drawing Sheets

| False Positives/Study | 80 | 50 | 20 | 10 |
|---|---|---|---|---|
| Sensitivity | 100% | 90% | 80% | 60% |

SYSTEM AND METHOD FOR DETECTING GROUND GLASS NODULES IN MEDICAL IMAGES

CROSS REFERENCE TO RELATED UNITED STATES APPLICATIONS

This application claims priority from: "GGND: Ground Glass Nodule Detection", U.S. Provisional Application No. 60/641,789 of Hong, et al., filed Jan. 6, 2005, the contents of which are incorporated herein by reference; "An Algorithm for the Evaluation of Ground Glass Nodules from Neighboring Structures in CT Volume Data", U.S. Provisional Application No. 60/725,944 of Hong, et al., filed Oct. 12, 2005, the contents of which are incorporated herein by reference; and "Fast Algorithms for Filtering Candidates of Ground Glass Nodules Generated from Chest CT Data", U.S. Provisional Application No. 60/728,158 of Hong, et al., filed Oct. 19, 2005, the contents of which are incorporated herein by reference

TECHNICAL FIELD

This invention is directed to the detection and evaluation of ground glass nodules in digitized medical images.

DISCUSSION OF THE RELATED ART

Lung cancer is the leading cause of cancer death in the United States. Averaging over all diagnosed cases of lung cancer, the mean 5-year survival rate is only 15%. However for those specific lung cancers, which are diagnosed in an early stage, there is a much more favorable 5-year survival rate of up to 72%.

Much attention has been given to lung cancer screening and diagnosis with computed tomography (CT). Multi-slice CT machines are capable of scanning the entire lung volume at very high resolution in a single breath-hold, allowing for the detection of very small to large sized nodules.

A ground glass nodule (GGN) is a nodule in a volumetric image that form a compact region of voxels that collectively exhibit a different intensity pattern against the surrounding background tissues. A ground glass nodule (GGN) differs from a solid nodule in that the image properties vary significantly and are typically barely distinguishable from background tissues. Examples of GGNs are depicted in FIG. 1, where the GGNs are indicated by arrows. As can be seen, some GGNs are easily distinguishable from the surrounding background tissue, some are barely distinguishable, and there exist significant variation in the intensity distribution and shape of different GGNs. Depending on its stage of development, the attenuation/intensity levels as well as the distribution of GGNs vary significantly and are often barely distinguishable from background tissues. Reliable detection of small GGNs is an important extension to the capability a computer-aided detection (CAD) system for the lungs. However, because of the very nature of GGNs, it is difficult to design an automatic algorithm that is capable of reliably detecting GGNs from volumetric lung CT images. No current lung CAD system is reported to be able to detect GGNs.

Several techniques have been proposed to identify whether significant ground glass attenuations/opacities, which refer to lung regions with a hazy increase in lung attenuation through which pulmonary vessels may be seen, develop in lung CT images. These techniques include multiple neural networks, texture analysis, and density masks. However, these techniques are not applicable for detecting GGNs from lung CT images, as identifying significant ground glass attenuations/opacities is easier than detecting GGNs in lung images.

Different types of GGNs exhibit significantly different intensity properties, which contribute to the formation variations among GGNs. It is not practical to rely solely on intensity to differentiate GGNs from background anatomical tissue structures. In addition, compactness is the only shape property suitable for characterizing the shape description of differently sized GGNs. Although neural network based techniques can efficiently accommodate significant variations in GGN formation, however, they tend to produce false positives when tuned to handle small sized GGNs. This is because many different tissues in lung CT images have similar grayscale distributions and structure formation as GGNs.

Texture based techniques can capture the small differences in spatial intensity distribution that differentiates GGNs, however, the amount of variability over different GGNs can diminish the discriminating power of texture techniques. In addition, a significant percentage of GGNs do not exhibit stable texture-like properties.

SUMMARY OF THE INVENTION

Exemplary embodiments of the invention as described herein generally include methods and systems for detecting ground glass nodules in volumetric lung CT images. According to an embodiment of the invention, a Markov random field (MRF) based technique can detect GGNs by transforming an input volumetric lung data into a volumetric log likelihood field and detecting significant peaks in the log likelihood field. Further embodiment of the invention include algorithms for the quick filtering of GGN candidates. The input to each algorithm is a location for a candidate, and the output is a binary decision on if this candidate is a false positive. The algorithms can be used in a sequence to decimate a candidate list. Further embodiments can identify and isolate a candidate when it may be surrounded by neighboring structures. Once it is isolated, simple rules can determine the likelihood of it being a GGN.

According to an aspect of the invention, there is provided a method of detecting ground glass nodules in a digitized medical image that includes the step of providing a digital chest image comprising a plurality of intensities corresponding to a domain of points in a n-dimensional space, calculating a probability distribution function of background lung tissue in said chest image based on a Markov random field model of said lung tissue, estimating a variation range of said background tissue probability distribution function, estimating a probability distribution function of an image point belonging to a ground glass nodule from said variation range of said background tissue probability distribution function by using a function corresponding to the variation range of the background tissue probability distribution function, and calculating a log likelihood function of said image from said background tissue probability distribution function and said estimated ground glass nodule probability distribution function, wherein said a log likelihood function represents the confidence that a point in said image is not part of a ground glass nodule.

According to a further embodiment of the invention, the method comprises comparing said log likelihood function value for each point in said image to a confidence value of each point belonging to the background tissue, wherein a point is a candidate ground glass nodule location if its log likelihood function value is less than said confidence value.

According to a further embodiment of the invention, the method comprises segmenting the image and selecting the subset of image domain points corresponding to the lungs.

According to a further embodiment of the invention, the probability distribution function of background lung tissue is represented by $P(X_s|X_{N(s)}, c_0)$, $s \in S$, wherein s is a point in the domain of image S, $X_s$ is a random field that maps the points s to a set of greyscale intensities, $X_{N(s)}$ is a random field that maps points in a neighborhood $N(s)$ of a point s to the set of greyscale intensities, and $c_0$ is a parameter of the Markov random field model that characterizes the background tissue.

According to a further embodiment of the invention, the log likelihood function $L(s)$ is represented by $L(s)=\log(P(X_s|X_{N(s)},c_0))-H(\log(P(X_s|X_{N(s)},c_0)))$, s∈S, wherein the function $H(\,)$ represents a function corresponding to the variation range of the background tissue probability distribution function.

According to a further embodiment of the invention, the function corresponding to the variation range of the background tissue probability distribution function corresponds to $P(X_s|X_{N(s)},c_0)$ at an upper confidence level.

According to a further embodiment of the invention, the function corresponding to the variation range of the background tissue probability distribution function corresponds to a mean function of $P(X_s|X_{N(s)},c_0)$.

According to a further embodiment of the invention, the method comprises defining a 3D seed block about said candidate ground glass nodule location to initialize a foreground region, calculating the average intensity of said seed block, defining a new 3D block that is a neighbor of said foreground region, and calculating the average intensity of said new block, and adding said new block to said foreground region if the average intensity of said new block is close to the average intensity of said seed block.

According to a further embodiment of the invention, the method comprises terminating the addition of new blocks to said foreground region if no neighboring blocks have an average intensity sufficiently close to the intensity of the seed block, and measuring the volume and compactness of said foreground region, wherein said candidate ground glass nodule contained in said foreground region is a false positive if either the volume of the foreground region is too large or the compactness of the foreground region is too small.

According to a further embodiment of the invention, if said candidate ground glass nodule location is in a center of a 2D slice of said image, the comprises defining a 2D seed block about said candidate ground glass nodule location to initialize a foreground region, calculating the average intensity of said seed block, defining a new 2D block that is a neighbor of said foreground region, and calculating the average intensity of said new block, and adding said new block to said foreground region if the average intensity of said new block is close to the average intensity of said seed block.

According to a further embodiment of the invention, the method comprises terminating the addition of new blocks to said foreground region if no neighboring blocks have an average intensity sufficiently close to the intensity of the seed block, measuring the volume and compactness of said foreground region, wherein said candidate ground glass nodule contained in said foreground region is a false positive if either the volume of the foreground region is too large or the compactness of the foreground region is too small, and examining the 2 slices that neighbor the candidate ground glass nodule location slice, wherein said candidate ground glass nodule contained in said foreground region is a false positive if it has high intensity neighbors in either of the two neighboring slices.

According to a further embodiment of the invention, if said candidate ground glass nodule location has a high contrast in its neighborhood, the method comprises providing a candidate volume of interest about said candidate ground glass nodule location, selecting a plurality of reference volumes of interest from said image, wherein each volume of interest is inside the lungs, the volumes are far apart, and wherein the average intensity of each volume of interest is a background level intensity, rescaling the intensities of each volume to be in a range from 0 to $I_{max}$, wherein $I_{max}$ is the same for each volume of interest, for each pair of adjoining voxels in each volume of interest, calculating an intensity co-occurrence matrix and a gradient co-occurrence matrix, calculating an inertia, a contrast, and a correlation value from the intensity co-occurrence matrix for each volume of interest, calculating an inverse difference moment from said gradient co-occurrence matrix, determining the candidate volume of interest to contain a ground glass nodule its inertia, contrast, correlation and an inverse difference moment values are above threshold values determined from the reference volumes of interest.

According to a further embodiment of the invention, the method comprises forming an intensity histogram for each volume of interest, and a gradient histogram for each volume of interest, wherein said intensity co-occurrence matrix is calculated form said intensity histogram, and said gradient co-occurrence matrix is calculated from said gradient histogram.

According to a further embodiment of the invention, the method comprises providing a seed point for the background and a seed point for an neighbor object of said candidate ground glass nodule, modeling a probability distribution function $\overline{\omega}^B$ for the background, a probability distribution function $\overline{\omega}^V$ for the neighbor object, and a probability distribution function $\overline{\omega}^C$ for the candidate ground glass nodule and determining a mean and variance for each distribution, computing an affinity map of each point with respect to each of the background seed, neighbor object seed, and candidate ground glass nodule seed, from an affinity function $A^O(b,c)$ that calculates the likelihood that a pair of points (b,c) belong to the same object O, defining a candidate set from those points whose affinity map value with respect to the candidate ground glass nodule is greater than the affinity map value with respect to the background, and defining a neighbor set from those points whose affinity map value with respect to the neighbor object is greater than the affinity map value with respect to the background.

According to a further embodiment of the invention, if the candidate set and the neighbor set intersect, the method comprises using morphological operations to separate the candidate set form the neighbor set.

According to a further embodiment of the invention, the background seed point is a point with a minimum intensity, and the neighbor object seed point is selected from a point in a neighborhood of the candidate ground glass nodule with a maximum intensity.

According to a further embodiment of the invention, the method comprises applying a band pass filter to the image, wherein noise and intensity variations across the image are reduced.

According to a further embodiment of the invention, the band pass filter is represented by $$H(u)=(1-e^{(u_x^2+u_y^2)/(2\sigma_d^2)})e^{(u_x^2+u_y^2)/(2\sigma_d^2)},$$

wherein $u_x$ and $u_y$ are the x- and y-components of the frequency u, and $\sigma_d$ is the width of the filter.

According to a further embodiment of the invention, the mean and variance of the background, neighbor object, and candidate ground glass nodule are determined by dividing the intensity range of the image into 3 sub-ranges, a low intensity range, a mid-intensity range, and a high intensity range, and computing a mean and variance of each sub-range, wherein the mean and variance of the low intensity range corresponds to the background, the mean and variance of the mid-intensity range corresponds to the candidate ground glass nodule, and the mean and variance of the high intensity range corresponds to the neighbor object.

According to a further embodiment of the invention, the probability distribution function of the candidate ground glass nodule is represented by $$\varpi^C(x) = e^{\frac{(I(x)-m_C)^2}{2\sigma_C^2}},$$

wherein I(x) is the intensity at point x, $m_c$ is the mean ground glass nodule intensity and $\sigma_c$ is its variance, the probability distribution function of the background is represented by $$\varpi^B(x) = \begin{cases} e^{\frac{(I(x)-m_B)^2}{2\sigma_B^2}}, & \text{if } I(x) > m_B, \\ 1, & \text{otherwise} \end{cases}$$

wherein $m_B$ is the mean background intensity and $\sigma_B$ is its variance, and the probability distribution function of the neighbor object is represented by $$\varpi^V(x) = \begin{cases} e^{\frac{(I(x)-m_V)^2}{2\sigma_V^2}}, & \text{if } I(x) < m_V, \\ 1, & \text{otherwise} \end{cases}$$

wherein $m_V$ is the mean neighbor object intensity and $\sigma_V$ is its variance.

According to a further embodiment of the invention, the affinity function $A^O(b,c)$ that calculates the likelihood that a pair of points (b,c) belong to the same object O is represented by $$A^O(b,c) = \sqrt{\Psi(b,c)\phi^O(b,c)}$$

wherein $\Psi(.,.)$ denotes a global component represented by $$\varphi^C(b,c) = \frac{\min\{\varpi^C(b), \varpi^C(c)\}}{\min\{\varpi^C(b), \varpi^C(c)\} + \max\{\varpi^B(b), \varpi^B(c)\} + \max\{\varpi^V(b), \varpi^V(c)\}},$$

wherein I(b) and I(c) are the intensities of the two points (b,c), and $\phi(.,.)$ denotes a local component, wherein the local component two point b and c belonging to the candidate ground glass nodule is represented by $$\Psi(b,c) = e^{\frac{(I(b)-I(c))^2}{2\sigma_d^2}},$$

wherein the local component of these two points belonging to the background and the neighbor object can be obtained by permutation of the labels C, B, and V.

According to a further embodiment of the invention, the affinity map for each of the background, the candidate ground glass nodule, and the neighbor object are computed by initializing the affinity map value M(c) of the respective seed point c to be 1, searching the neighbors of the seed point for a point d that has a maximum affinity function with respect to the seed point, updating the map value M(d) of d according to M(d)=min{M(c), $A^O$(c,d)}, and recursively propagating affinity map values to the other points in the image.

According to another aspect of the invention, there is provided a program storage device readable by a computer, tangibly embodying a program of instructions executable by the computer to perform the method steps for detecting ground glass nodules in a digitized medical image.

DETAILED DESCRIPTION OF THE PREFERRED EMBODIMENTS

Exemplary embodiments of the invention as described herein generally include systems and methods for detecting and evaluating ground glass nodules (GGNs) in volumetric lung images.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 1:
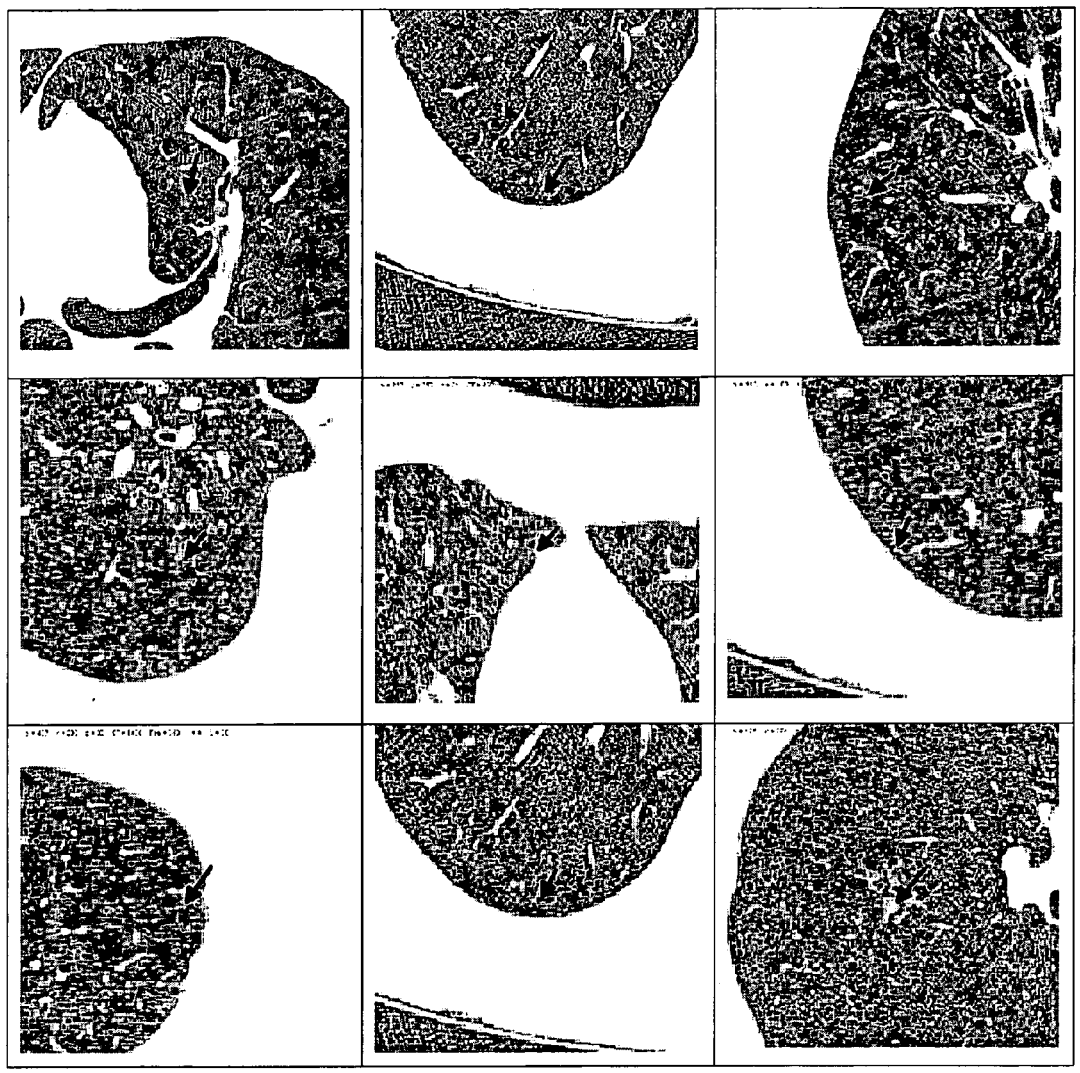
FIG. 1 depicts various examples of ground glass nodules, according to an embodiment of the invention.
Figure 2:
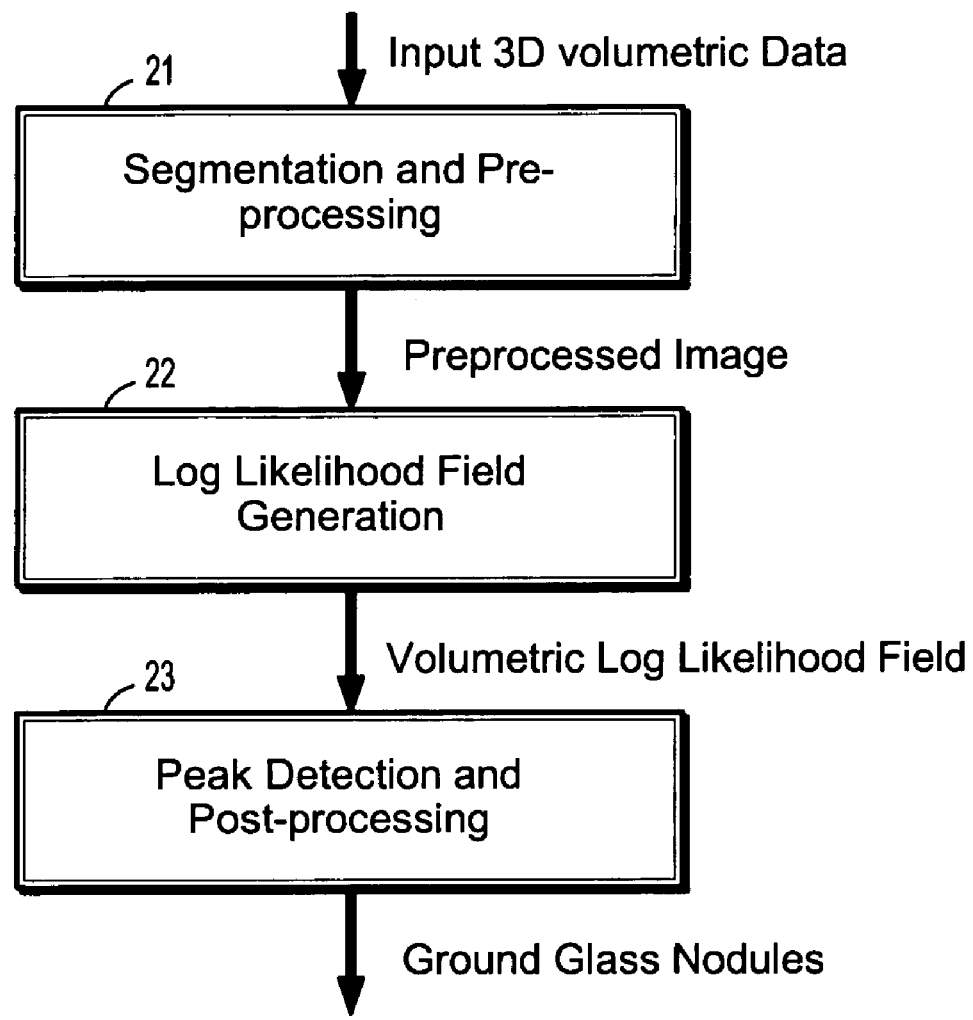
FIG. 2 depicts a flow chart of a GGN detection algorithm, according to an embodiment of the invention.

A flow chart of a GGN detection algorithm, according to an embodiment of the invention, is depicted in FIG. 2. The algorithm includes three relatively independent steps: segmentation and preprocessing at step 21, generating a log likelihood field at step 22, and peak detection and post-processing at step 23. The segmentation and preprocessing step 21 applies a heuristics-based segmentation algorithm to input 3D volumetric data to separate the lung regions from the chest images. Methods of segmentation are well known in the art of image analysis. In addition, smooth filtering operations as well as noise removal operations can be applied to improve the image quality. The log likelihood field generation step 22 takes the preprocess image from step 21 and transforms the input volumetric lung images into a volumetric log likelihood field of the same size with the value of each voxel indicating the likelihood of presence of GGNs. The peak detection and post-processing step 23 detects significant peaks in the log likelihood field and locates significant connected objects associated with the significant peaks in the volumetric log likelihood field to form the detected results. The post processing step 23 sorts the detected objects according to the overall likelihood value and returns the most significant ones.

As discussed above, neither the grayscale value distribution nor the compactness measures can be used directly as a differentiating feature to identify GGNs. However, whenever a GGN is located, it is usually easy for a human subject to distinguish it from the background structures in which it resides, even though the distinguishableness of the GGN itself may not be significant. Thus, as a whole, there exist spatial-intensity properties of GGNs that can be effective in distinguishing a GGN from the background tissues.

A number of techniques can be used to capture/enhance such spatial-intensity properties to facilitate the detection of GGNs. One such technique is Markov random field (MRF) modeling. However, the detection of GGNs presents several challenges to an MRF model. The size of a GGN region is typically small, and there exist significant variations among different GGNs. An MRF-based technique according to an embodiment of the invention establishes an MRF model that characterized the non-target tissue structures, such as background tissue structures, that is, everything except the GGNs. Detecting GGNs in an input volumetric lung image is transformed into detecting abnormalities in the background tissue model estimated from the input volumetric lung image. This approach avoids the variations among the GGNs, as the GGNs primarily differentiate themselves from the background structures of the volumetric image in which they reside. The GGNs typically do not have salient properties that are independent of the surrounding background tissue structures. In each input volumetric lung image, a sufficient amount of structure is available to enable a reliable construction of an MRF model. Even though the background structures may exhibit significant variation, the sample size is large enough for an effective model to be constructed that models the intrinsic properties of the background. As long as a GGN can be differentiated from the background structures, it can be detected by an MRF model derived from the background tissue structures.

According to an embodiment of the invention, let $D_x$, $D_y$, and $D_z$ denote the x-, y-, and z-dimensions of a 3D volumetric lung image, respectively. The set of all coordinates, $$S=\{(x,y,z) | 0 \leq x \leq D_x, 0 \leq y \leq D_y, 0 \leq z \leq D_z\},$$

forms a finite site set of size |S|. Without loss of generality, the site set S can be indexed using a single index number, s, instead of the x-, y-, and z-coordinates, to simplify notation. The set of grayscale levels, $\Lambda$, constitutes the state space of a site. Let $$\Omega = \prod_{s \in S} \Lambda = \Lambda^S.$$

A 3D lung volumetric image can be viewed as a map from S to $\Omega$:

$$x: S \to \Lambda^S,$$

which is referred to as a configuration on S in configuration space $\Omega$. Let $X=\{X_s, s \in S\}$ denote the random field on $\Omega$. Let H be the joint probability with $\Pi(X=x)>0$. It is known that the joint probability distribution $\Pi(X)$ is uniquely determined by its local conditional probability density function (LCPDF) $\Pi(X_s=x_s|X_r=x_r; r \neq s)$. Let $N_s \subset S$ denote a neighborhood, and given a set of neighboring sites s with respect to a neighborhood N, then X is a Markov random field (MRF) if $$\Pi(X)>0,$$

$$\Pi_s(x_s|X_{(s)})=P(x_s|x_r, r \in N_s),$$

where $(s)=S-\{s\}$. It follows from the RF-Gibbs equivalence theorem that X is an MRF on S with respect to the neighborhood N if and only if X is a Gibbs random field on S with respect to the neighborhood N, which takes the following form:

$$P(X) = Z^{-1} e^{-\frac{1}{T}U(X)},$$

where $$Z = \sum_{X \in \Omega} \exp\left(-\frac{1}{T}U(X)\right)$$

is a normalizing constant known as the partition function, T is a constant referred to as the temperature, and U(X) is an energy function.

According to an embodiment of the invention, a volumetric lung image without any GGNs can be characterized by an MRF model, $\Pi(X=x|c_0)$, where $c_0$ represents the set of parameters corresponding to the volumetric lung image. A volumetric lung image with GGNs that exhibit the same local intensity distribution except for sites inside the GGNs can be characterized by MRF models $\Pi(X=x|c_k)$, where $C_k$, $k=1, \ldots, C_{max}$, are the set of model parameters indicating the type of the GGN and $C_{max}$ represents the maximum number of possible types of GGNs. For a given input volumetric lung image, x, if $\Pi(X=x|c_k)$, $c_k$, $k=1, \ldots, C_{max}$, are known, the presence of GGNs in x can be predicted using the Bayesian rule.

However, some issues need addressing. In order to reliably predict the presence of GGNs, the models $\Pi(X=x|c_k)$, $c_k$, $k=0, \ldots, C_{max}$, need to be constructed accurately from one instance of input volumetric image. Typically, $\Pi(X=x|c_0)$ can be easily estimated, as regardless of whether an input volumetric image contains GGNs, there is sufficient information in a single input volumetric image for a reliable estimate of $\Pi(X=x|c_0)$. In addition, constructing $\Pi(X=x|c_0)$ from a single input volumetric image instead of from a set of pre-collected samples accommodates the variation of background tissue structures which can dominate the difference between the background tissue structures and GGNs.

There are additional issues for constructing $\Pi(X=x|c_k)$, $c_k$, $k=1, \ldots, C_{max}$. First, GGNs are small in size as compared to the overall image size. Second, there are significant variations between different GGNs, which could require a large number of models. It is impractical to collect a large sample of volumetric images for reliably estimating $\Pi(X=x|c_k)$, $c_k$, $k=1, \ldots, C_{max}$. Moreover, even if a reliable estimate of $\Pi(X=x|c_k)$, $c_k$, $k=1, \ldots, C_{max}$ is available, it may be insufficient to discriminate GGNs from background tissue, as GGNs are typically only distinguishable relative to the surrounding background tissue structures. A well estimated $\Pi(X=x|c_k)$ could mis-identify a significant amount of background tissue structure as GGNs. Finally, estimating $\Pi(X=x|c_k)$, $c_k$, $k=1, \ldots, C_{max}$, is computationally intensive.

Whenever a volumetric lung image contains GGNs, the presence of a GGN creates small compact abnormalities at positions where the GGNs appear in $\Pi(X=x|c_0)$. This provides an indicator to identify GGNs, which can be assessed by exploring the joint probability distribution in small local neighborhoods. Let $G_s=(s,G_{(s)})$, where $G_{(s)}=G-\{s\}$, be a small neighborhood centered at site s. According to an embodiment of the invention, using the Bayesian rule, the site s belongs to background tissue structure if $$\frac{P(c_0 \mid X_{G_s})}{P(c_k \mid X_{G_s})} = \frac{P(X_s \mid X_{G(s)}, c_0)P(c_0)}{P(X_s \mid X_{G(s)}, c_k)P(c_k)} = a_s \frac{P(X_s \mid X_{N(s)}, c_0)}{P(X_s \mid X_{N(s)}, c_k)} \geq l,$$

where as is a constant and l is a pre-defined likelihood threshold greater than 1 which determines the confidence of site s being a background tissue structure. Typically, l is between 2 and 5. Taking a logarithm and moving the constant to the right result in the following discrimination function:

$$\log(P(X_s|X_{N(s)},c_0))-\log(P(X_s|X_{N(s)},c_k))\geq la,$$

where $la=\log(l)-\log(a_s)$. A log liklelihood function according to an embodiment of the invention provides a quantified assessment of the degree of abnormality at a local neighborhood $G_s$. The higher the value of the log likelihood function at a site s, the more probable that site s is a background tissue site. As discussed above, $P(X_s|X_{N(s)}, c_k)$, $k=1, \ldots, C_{max}$ is not always reliably estimated for a single input image, which implies that there is no direct way to obtain this log likelihood value at site s. However, if a variation range of $P(X_s|X_{N(s)},c_0)$, s∈S can be estimated from an input volumetric image, the above discrimination function can be effectively approximated without a significant increase in classification errors by replacing the function $\log(P(X_s|X_{N(s)},c_k))$ with either a function corresponding to $P(X_s|X_{N(s)},c_0)$ at the upper confidence level or a medium/mean function of $P(X_s|X_{N(s)},c_0)$, and readjusting the value of la at site s. Thus, according to an embodiment of the invention, the log likelihood field of a given input volumetric image is defined as $$L(s)=\log(P(X_s|X_{N(s)},c_0))-H(\log(P(X_s|X_{N(s)},c_0))), s \in S,$$

where H( ) denotes a function corresponding to the variation range of $P(X_s|X_{N(s)},c_0)$, such as a mean field function.

According to an embodiment of the invention, the selection of the size of the neighborhood $G_s$ aids in the performance of the detection algorithm. A large $G_s$ is typically more effective in catching major variations in the background tissue structures and thus helps discriminate foreground tissue structures. However, if $G_s$ is too large, small GGNs may not be able to form significant enough abnormalities to be detected.

Figure 3:
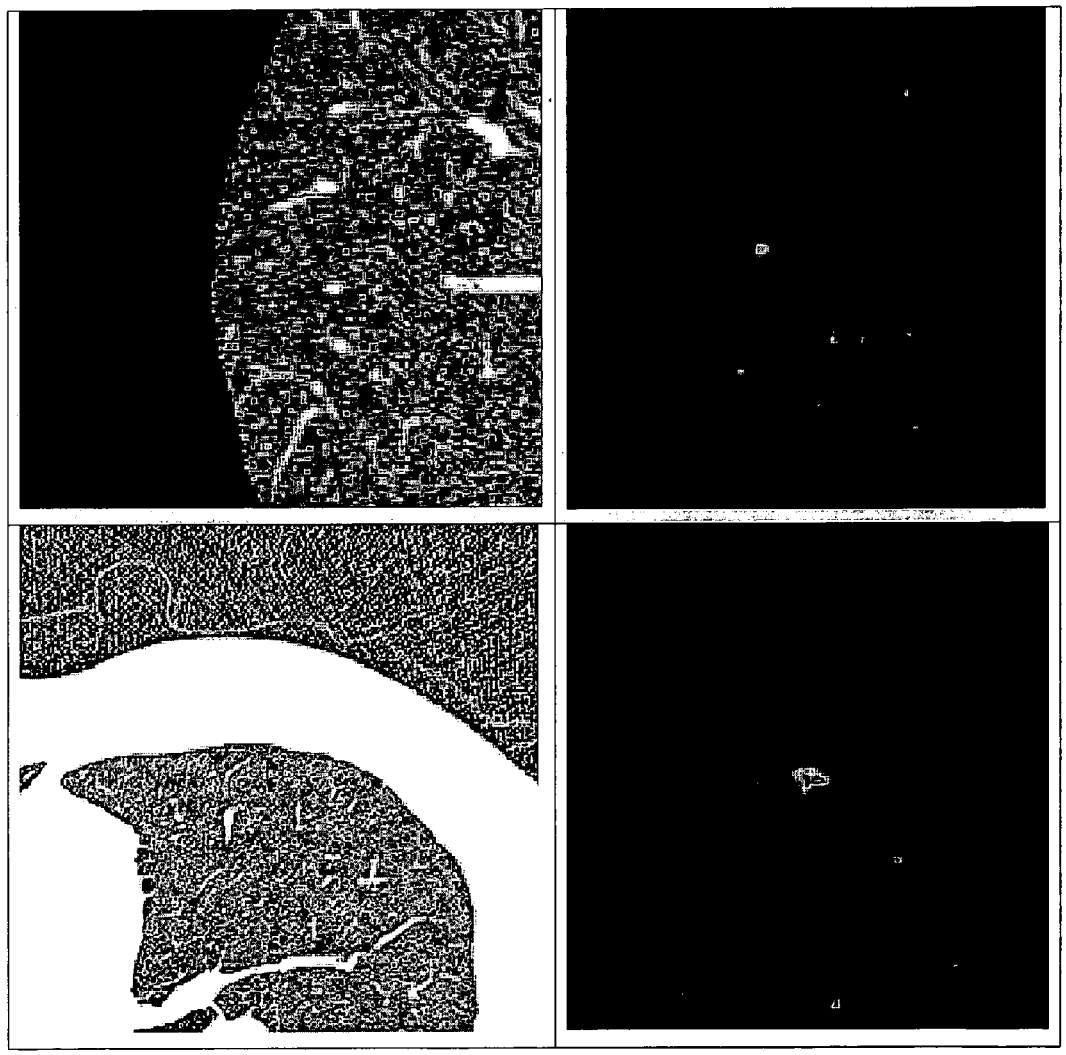
FIG. 3 illustrates two slices of two different volumetric images with corresponding slices of the log likelihood fields, according to an embodiment of the invention.

FIG. 3 illustrates two slices of two different volumetric images with corresponding slices of the log likelihood fields, according to an embodiment of the invention. For display purposes, the log likelihood slices are inverted. In this embodiment, $G_s$ is selected to be 7×7×3. The left column depicts the two slices of the different volumetric images, and the right column depicts the corresponding log-likelihood fields. The two bright spots in the right column locate the sites where the two GGNs are present. It can be seen that the presence of GGNs create a significant difference at the positions where the GGNs are located. The background tissue structures can create small bumps, which are insignificant, as shown in the figures.

Figures 4, 5:
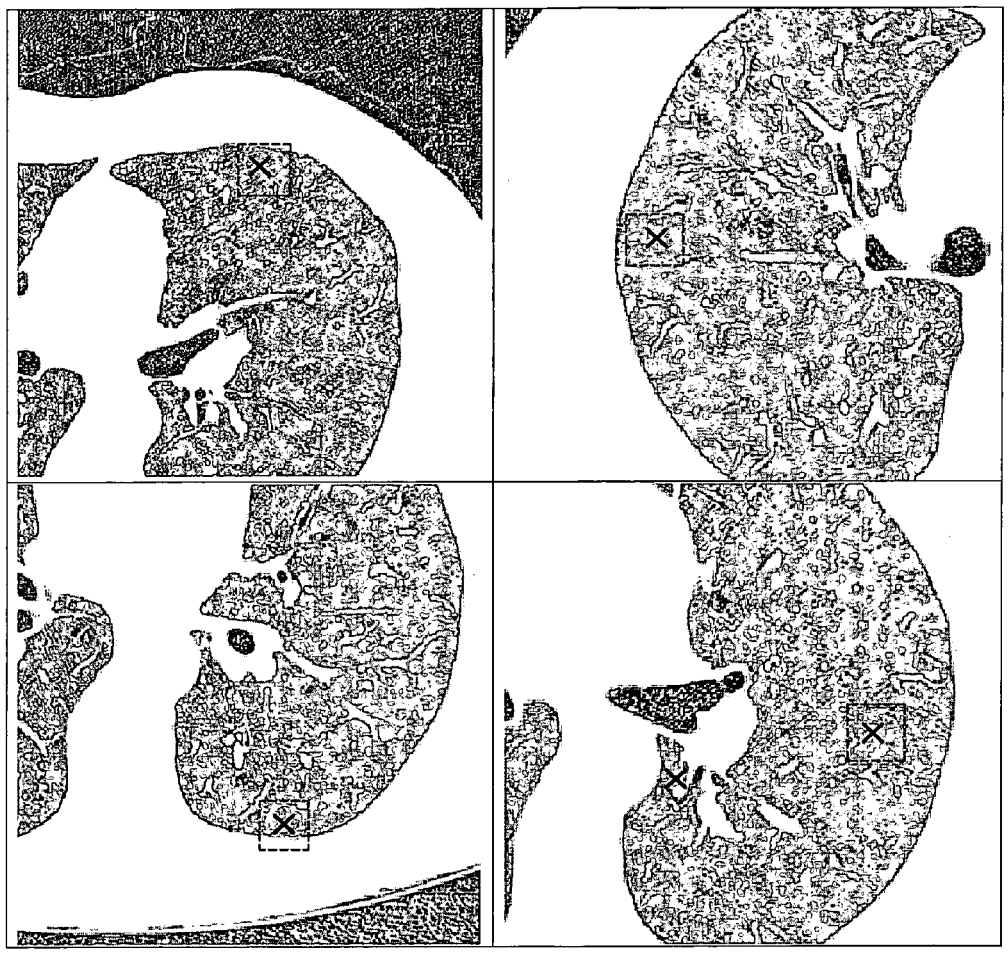
FIG. 4 is a table summarizing test results of a set of 8 chest CT images, according to an embodiment of the invention.
FIG. 5 depicts a few examples of detected GGNs, A few examples of the detected results are shown in FIG. 5.

An algorithm according to an embodiment of the invention was tested on a set of 8 chest CT images with 280 slices of 512×512 pixels. A total of 23 GGNs were identified and were independently verified by physicians. The test results are summarized in the table shown in FIG. 4. In the table, the term "sensitivity" is defined as the percentage of ground truth detected among all of the identified ground truth nodules. The term "false positives/study" refers to the number of false detections in one lung image. A few examples of the detected results are shown in FIG. 5. Referring to the figures, ground truths are marked with outlined boxes centered on GGNs, while detected results are marked with X's. A false positive was detected in the bottom right image.

According to a further embodiment of the invention, GGNs can be quickly filtered to remove false positives. One common type of false positive is caused by small regions formed by noise. These types of false positive can be identified by growing a foreground region around an input that is location of a candidate GGN. The input location can be viewed as seed point for growing the region. This region growing technique according to an embodiment of the invention is based on blocks instead of voxels. A set of parameters are determined from data. These parameters include, but are not limited to, the intensity range of the seed block, the decision rules for compactness and volume, and the allowed range of intensity variation between a foreground block and a seed block.

Figure 6:
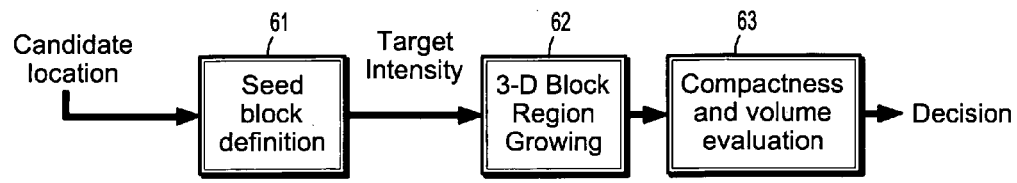
FIG. 6 is a flow chart of a method of identifying and removing false positive, according to an embodiment of the invention.

A flow chart of a method of identifying and removing false positive, according to an embodiment of the invention, is illustrated in FIG. 6. Referring now to the flow chart, the seed block is defined in step 61 so that its size is adaptive to the local intensity level and variance. The seed block size is initially set to a fixed value, and will decrease when the average intensity is too high or too low, as the block may include too much background or multiple objects. The initial value of the block size depends on the image resolution. In one exemplary embodiment, where the voxel size is 0.7 mm % 0.7 mm % 1.0 mm, the block size is 3% 3% 1 voxels. In both cases, the block size is reduced and the average intensity is recalculated. The average seed block intensity is recorded as the target intensity.

At step 62, the voxels in a volume of interest around the candidate point are grouped into small 3D blocks of equal size, except for a seed block. A block intensity is defined as the average intensities of all voxels in the block. In the region growing process, each block is assigned to a foreground if it is the direct neighbor of the seed block or another foreground block, and its block intensity is sufficiently close to that of the seed block.

After growing a block region, the total volume and compactness of the foreground region is computed at step 63. The candidate is determined to be a false positive if the volume is too large or compactness is too small, based on the assumption that a GGN is a compact and a relatively small region in the volume data.

Figure 7:
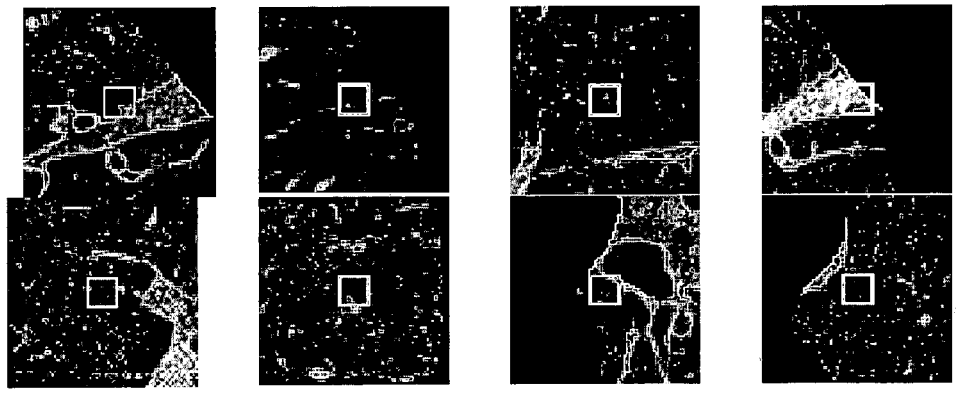
FIG. 7 depicts examples of false positive removal identified by block region growing and analysis, according to an embodiment of the invention.

FIG. 7 depicts examples of false positives identified by block region growing and analysis. The false positives are indicated by the outlined box in each panel. Each of these false positives either has an intensity very close to the background intensity or is located within a large, white tissue.

This algorithm works analogously to human observation: if the neighbor intensity is high, the object intensity should be much higher to be identified as a GGN; otherwise, if the background is dark, a light objects can be identified as a GGN.

This method according to an embodiment of the invention can eliminate 10%-40% false positives in less than 1 second.

Figure 8:
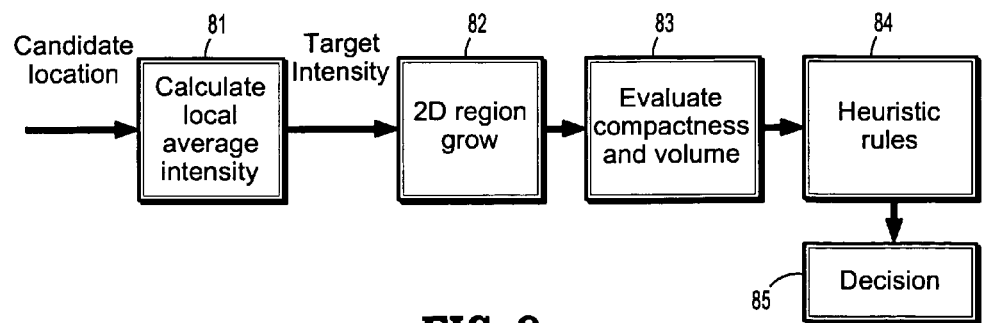
FIG. 8 is a flowchart of a 2D region growing algorithm according to an embodiment of the invention.

In other cases, a candidate location is in a center of a slice, in which case 2D region growing and analysis can be applied. This region growing method according to an embodiment of the invention can remove an obvious large object with high intensity. A flowchart of a 2D region growing algorithm according to an embodiment of the invention is shown in FIG. 8. Given a candidate location, the local average intensity around the candidate location is calculated in a small region of interest at step 81, and is saved as the target intensity. A 2D region is grown at step 82, starting from the candidate seed point. During the region growing process, a pixel is assigned to the foreground if its intensity is sufficiently close to that of the seed point, and if it is a neighbor of the seed point or another foreground pixel. According to an embodiment of the invention, a region growing intensity difference criteria is about !200 intensity units.

At step 83, the volume and compactness are computed for the grown region. Compactness can be defined according to an embodiment of the invention as size $$\text{compactness} = \frac{\text{size}}{(\max\{R_x, R_y\})^2},$$

were $R_x$ and $R_y$ are the ranges of the connected component in the x and y directions, respectively, and size is the number of foreground pixels in the object. A candidate is determined to be a false positive if it fails to satisfy a set of rules based on the size and compactness parameters. A candidate object should not be too large, and the larger it is, the more compact it should be in order to be a true GGN candidate. In an embodiment of the invention where a typical image size is on the order of 500% 500% 300 pixels, an object is too large is it exceeds a volume of about 800 voxels. In this embodiment, if the volume exceeds about 80 pixels, the compactness should be greater than about 0.45, while if the volume is between 60 and 80 voxels, the compactness should be greater than about 0.4, and if the volume is between 10 and 60 voxels, the compactness should be greater than about 0.25. These guidelines are exemplary and non-limiting, and other rules sets relating size to compactness that are either more detailed or less detailed are within the scope of an embodiment of the invention.

Figure 9:
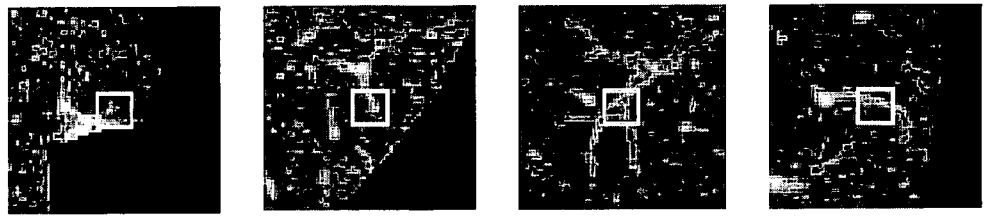
FIG. 9 depicts examples of false positives that were identified not to be GGNs due to their low compactness values, according to an embodiment of the invention.
Figure 10:
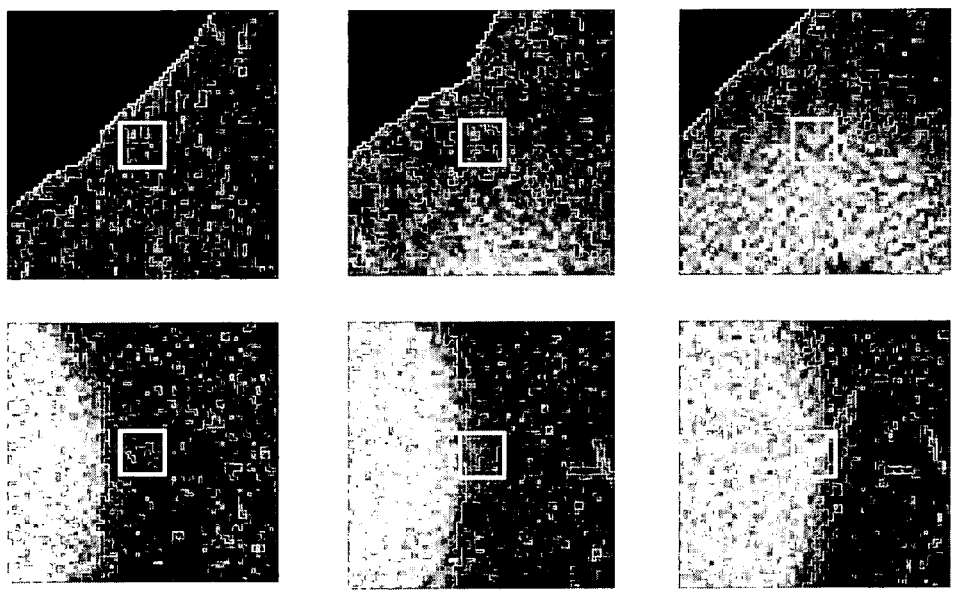
FIG. 10 depicts another set of images that were identified not to be GGNs, according to an embodiment of the invention.

At step 84, a set of heuristic rules is then applied. First, the neighboring two slices of the center slice are examined. If a large number of pixels in the center slice have very high-intensity neighbors in the two neighboring slices, it is regarded as a shadow of a large white tissue. This is an artifact formed by heart motion near chest walls. FIG. 9 depicts examples of false positives that were identified not to be GGNs due to their low compactness values. Again, the false positives are indicated by the outlined boxes. Another set of images that were identified not to be GGNs are depicted in FIG. 10. In these figures, the candidate objects were eliminated since they were in a shadow of white tissue. The two rows each illustrate a separate case. Three consecutive slices are shown for each case. The little square in the outlined box is the window in which the coverage rate is calculated. This region growing step according to an embodiment of the invention can also eliminate 10-40% of the false positive candidates in less than one second.

Figure 11:
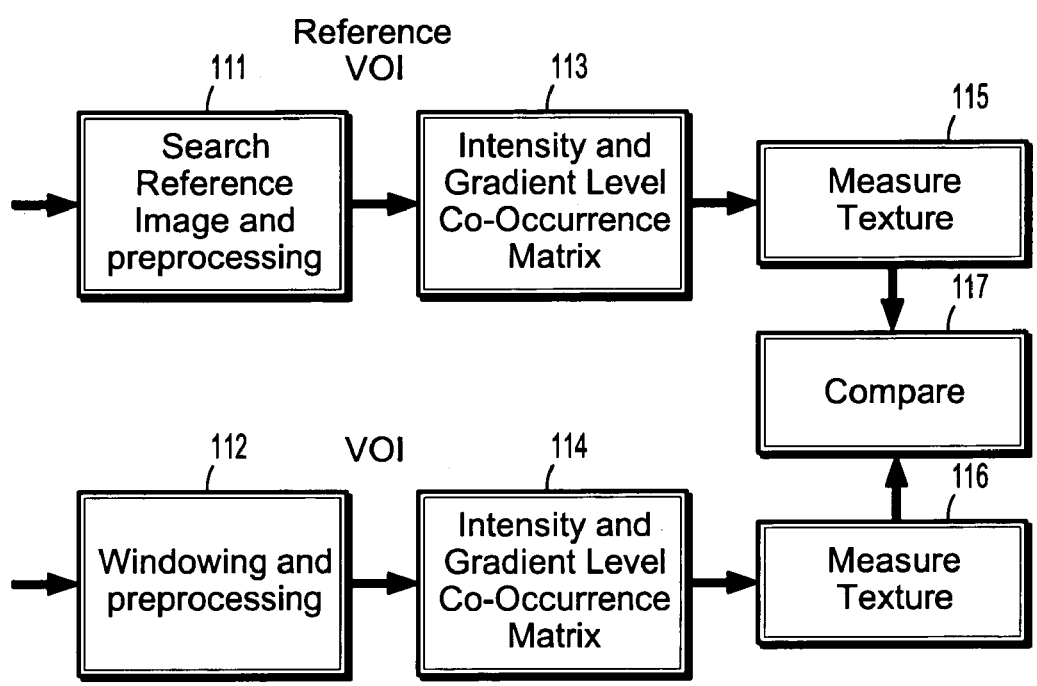
FIG. 11 is a flow chart of a co-occurrence matrix based texture feature, according to an embodiment of the invention.

Another technique according to an embodiment of the invention computes texture features based a low resolution co-occurrence matrix. A typical false positive removed by this algorithm will have high contrast in its neighborhood, which is not the case for a real GGN. A flow chart of a co-occurrence matrix based texture feature, according to an embodiment of the invention, is shown in FIG. 11.

Referring now to the flowchart, at step 111, a plurality of volumes-of-interest (VOIs) inside the volume are searched to use as reference VOI's. In one embodiment of the invention, the number of reference VOIs is 8, however, this value is exemplary and non-limiting. An exemplary, non-limiting volume for these VOIs is about 21% 21% 21 voxels. These are typical background regions inside the lung and far from each other, typically separated by more than about 100 voxels. A VOI is determined to represent the typical background if 95% of the voxels inside the VOI have intensities between 5 and 600. Then the intensity of each voxel within the VOI is normalized by being rescaled to the 0-1200 intensity range. This step ensures that the texture feature has minimal correlation with the average intensity level and the standard deviation of the regions. Note that the maximum rescaled value of 1200 is exemplary and non-limiting, and any other maximum value can be used and be within the scope of an embodiment of the invention. A similar normalization is performed on the candidate VOI at step 112.

At step 113, for each reference VOI, the intensity level co-occurrence matrix and gradient level co-occurrence matrix are calculated, and texture features are computed based on them at step 115. Similar computation are performed at steps 114 and 116 for the candidate VOI. The feature values will be averaged among all reference VOI's and then compared at step 117 with the feature values from the candidate VOI.

The intensity and gradient co-occurrence matrix values can be computed as follows, according to an embodiment of the invention. First, compute a low resolution intensity histogram of the VOI, with 8 bins. For the intensity matrix, the following bin sizes can be used: 0-125-250-375-500-625-750-875-Inf. For the gradient matrix, the following bin settings can be used: 0-62.5-125-187.5-250-282.5-375-437.5-Inf. Note that the number of bins, and the bin sizes and settings are exemplary and non-limiting, and other embodiments of the invention can use differing numbers of bins and different bin settings. In this embodiment using 8 bins, the intensity level co-occurrence matrix is an 8×8 matrix, whose component is denoted by MII(m,n). The component MII(m,n) means the number of neighboring pair that have intensity level m and n, where neighboring pair are the pair of voxel that have a pixel distance equal to 1. The gradient level co-occurrence matrix MGG is defined similarly.

Based on intensity level co-occurrence matrix, texture features such as the inertia, contrast and correlation can be computed, and the inverse difference moment is computed based on the gradient level co-occurrence matrix.

In tests of an embodiment of the invention, the threshold for inertia was determined to be less than 3 times that of the reference measurement; contrast was determined to be less than 2.2 times that of the reference measurement; correlation was determined to be greater than 0, and the gradient magnitude inverse difference moment was determined to be less than 3.0 times that of the reference measurement. These thresholds determined whether the candidate VOI contains an actual GGN, as opposed to a false positive.

These tests indicate that an inertia value that is too high implies a local variation that is too large, which does not occur with GGNs. GGNs have a moderate contrast with a positive linear grey tone dependency, but have a random instead of a homogeneous gradient map, which leads to a low gradient magnitude inverse difference moment. In addition, GGN's do not have large values for texture features, while the heart beat effect and boundary effect have large texture values.

Figure 12:
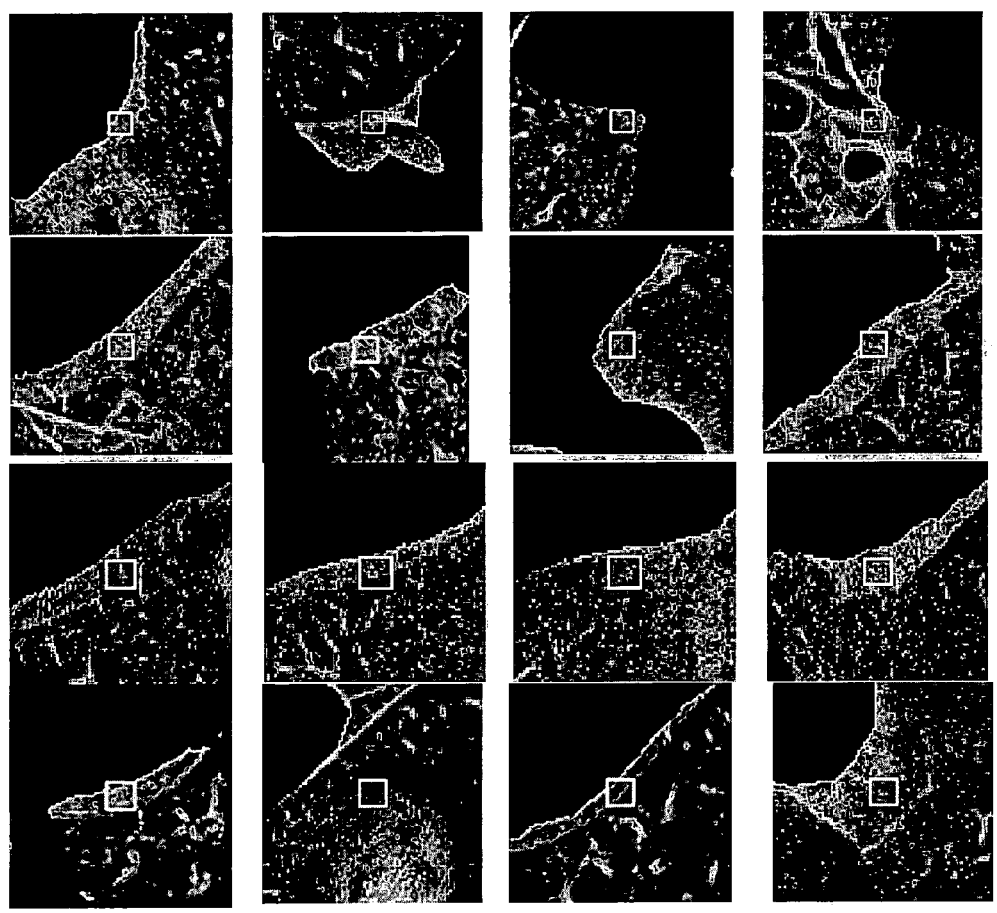
FIG. 12 illustrates false positives filtered by a texture analysis procedure according to an embodiment of the invention.

FIG. 12 illustrates false positives filtered by a texture analysis procedure according to an embodiment of the invention. Referring now to the figure, the top row depicts sample images with a high inertia texture, the second row depicts sample images with a high contrast, the third row depicts sample images with a negative correlation, and the bottom row depicts sample images with a high gradient magnitude inverse difference moment. The white boxes in the figure panels outline the false positives caused by heart motion and boundary effect, which were removed.

According to a further embodiment of the invention, an algorithm can evaluate subtle candidates by identifying and isolating a candidate when it may be surrounded by neighboring structures. Once it is isolated, simple rules can be used to determine the likelihood of it being a GGN.

GGNs have high variance in intensity values. There is no global intensity threshold for GGNs. The intensity could be anywhere between the intensity of a bright vessel and a dark background. In addition, GGNs may be connected or in the vicinity of a thin vessel or a bright tissue. The GGN object may have loose connections between the internal voxels, and the connection with neighboring structures can also be fuzzy.

An algorithm according to an embodiment of the invention utilizes principles of fuzzy connection and adapts them to isolating a GGN from its neighboring structure and background. Since there is no clear threshold between GGN and background, competition scheme is developed between the objects and the background. The foreground objects, specifically the GGN and the connecting structure, will not compete with each other at the voxel level, because the GGN is loosely connected, and in many cases, connected through the vessel surrounded by the GGN. When the vessel is removed, the GGN object can be split into many pieces. Therefore, the GGN and the vessel objects are permitted to compete with the background, with overlapping among the two objects being allowed. Afterwards, shape factors are used to determine to what object the overlapping voxels belong.

If the background is treated as an "object", there will two or three objects: the GGN, the background, and a neighboring tissue, if there is one. Seed points are chosen for each of the three above objects, denoted as C, B, and V. The seed point for C is given as an input, but the seed points for B and V need to be determined. Afterwards, for each point in the VOI, an affinity measure is computed that describes the fuzzy connection with each of the seed points. The result is three 3D maps associated with each seed point. By competition the foreground object is obtained. The foreground object could contain both C and V, the separation of which is achieved through morphological operations.

Figure 13:
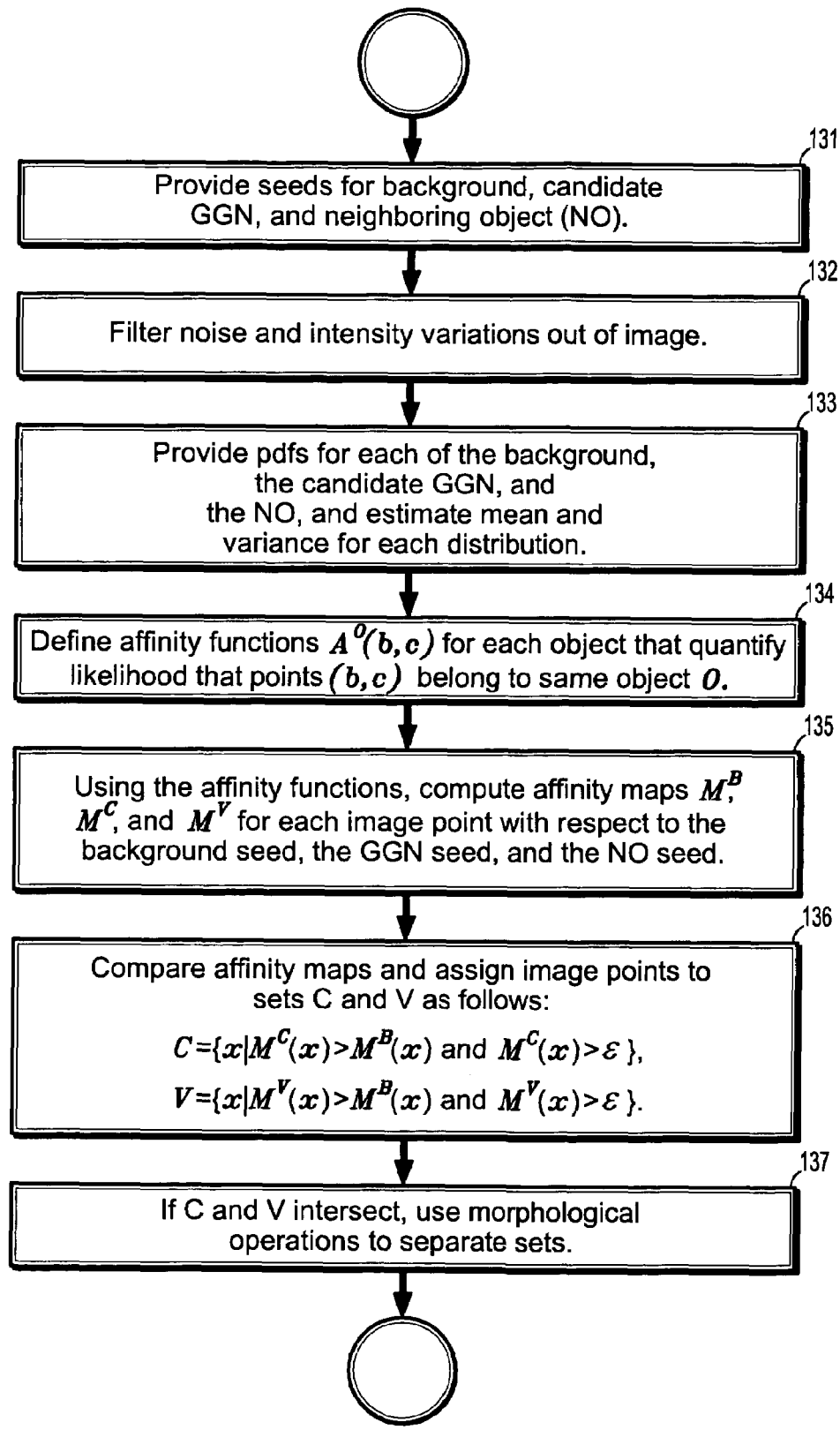
FIG. 13 is a flowchart of a competitive fuzzy connection analysis, according to an embodiment of the invention.

A flowchart of a competitive fuzzy connection analysis according to an embodiment of the invention is shown in FIG. 13. Referring now to the flowchart, at step 131, the seed point of the GGN candidate C is given as the input. The background object B starts from a local voxel with lowest intensity. To determine the seed point for a neighboring tissue object V, one searches for a point with the maximum intensity in a small neighborhood of the input location. The seed point of V should be close to that of C since there is no interest in an object far away. If the seed of V has a low intensity or if the intensity is too close to that of C, then there is no V in the current VOI. This means the candidate has no neighboring structure.

Before computing the affinity function, noise and intensity variations across the image are reduced at step 132. Since noise is high frequency and intensity variation is low frequency, they can be filtered by applying a mid-pass filter defined as $H(u)=(1-e^{(u_x^2+u_y^2)/(2\sigma_d^2)})e^{(u_x^2+u_y^2)/(2\sigma_d^2)}$, where $(u_x, u_y)$ is the x and y index in the frequency domain.

At step 133, the intensity distributions are estimated. The intensity distribution will be used to compute the affinity value of two points. First, the mean and variances for the three objects are estimated. To compute the mean and variance, the population of each object is estimated by setting intensity ranges. A low intensity range is set for the background B, a middle range is set for the GGN candidate C, and a high range is set for the neighboring object V. In the VOI, a threshold is used to divide the voxels into three populations, and to compute the intensity mean and variance. The distributions are then estimated as Gaussian distributions, but will flatten out for B and V in the low and high intensity ends:

C object:
$$\varpi^C(x) = e^{-\frac{(I(x)-m_C)^2}{2\sigma_C^2}};$$

B object:
$$\varpi^B(x) = \begin{cases} e^{-\frac{(I(x)-m_B)^2}{2\sigma_B^2}}, & \text{if } I(x) > m_B; \\ 1, & \text{otherwise} \end{cases}$$

and

V object:
$$\varpi^V(x) = \begin{cases} e^{-\frac{(I(x)-m_V)^2}{2\sigma_V^2}}, & \text{if } I(x) < m_V, \\ 1, & \text{otherwise} \end{cases}$$

where m and σ are the estimated intensity mean and variances for each object.

At step 134, affinity functions used to perform a fuzzy connectedness region growing are defined. The affinity functions A describe the likelihood of a pair of neighboring voxels (b,c) belonging to the same object C:

$$A^C(b,c) = \sqrt{\Psi(b,c)\phi^C(b,c)},$$

where $\Psi(.,.)$ denotes a global component and $(.,.)$ denotes a local component. The global component does not assume prior knowledge of intensity distributions, and is only based on the intensity similarity between the two point b and c:

$$\Psi(b, c) = e^{-\frac{(I(b)-I(c))^2}{2\sigma_d^2}},$$

where $\sigma_d$ is a constant. The local component, on the other hand, uses the intensity models of known objects C, B, and V, which have been estimated above. The definition below describes the likelihood of two point b and c belonging to the object C:

$$\varphi^C(b, c) = \frac{\min\{\varpi^C(b), \varpi^C(c)\}}{\min\{\varpi^C(b), \varpi^C(c)\} + \max\{\varpi^B(b), \varpi^B(c)\} + \max\{\varpi^V(b), \varpi^V(c)\}}.$$

The likelihood of these two points belonging to B and V can be obtained by permutation of C, B, and V in the above equation. The affinity value is ranged between 0 and 1.

At step 135, using the above definition of affinity functions, the affinity map of each point is computed with respect to the seed points. The affinity function describes the affinity between two neighboring points, while the affinity map contains the affinity between any point and the seed point. This is built up by propagating the affinity values in the VOI, starting from the seed point. Initially the seed point c has the highest map value M(c)=1, while all the others have 0 as their values. From the immediate neighbors of the seed point c, denoted by η(c), one searches for the point d that has the highest affinity value: $d = \max_{d \in \eta(c)} A(c,d)$. The map values of d are then updated with $M(d) = \min\{M(c), A(c,d)\}$. The map values then recursively propagate to other points.

Competition between foreground and background is performed at step 136. Now that there are three (or two if there is no object V) object maps, the competition means that the affinity values of difference objects are compared for each voxel, and the voxels are labeled. One can obtain several voxel sets defined as follows:

$$C = \{x | M^C(x) > M^B(x) \text{ and } M^C(x) > \epsilon\},$$

and $$V = \{x | M^V(x) > M^B(x) \text{ and } M^V(x) > \epsilon\}.$$

The union set T=C∪V is also recorded. Note that C and V are not exclusive. Suppose a vessel is passing through a GGN. Then a traditional method will break the vessel in two since it is blocked by the GGN in between, while a method according to an embodiment of the invention will leave it connected.

At step 137, morphological operations are applied to the object set to further separate the objects C and V, where the sets intersect. Consider a common scenario where a thin vessel passes through a GGN. An opening using a spherical component will keep the compact part of the object while eliminating the thin part. By adaptively choosing the opening radius, one can separate a GGN with a thin vessel from a thick vessel even if they have the same intensity level. Starting from a small radius, one can adaptively increase the radius until the resulting sets are relatively small and compact. Finally, one obtains the separation of the sets C and V.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 14:
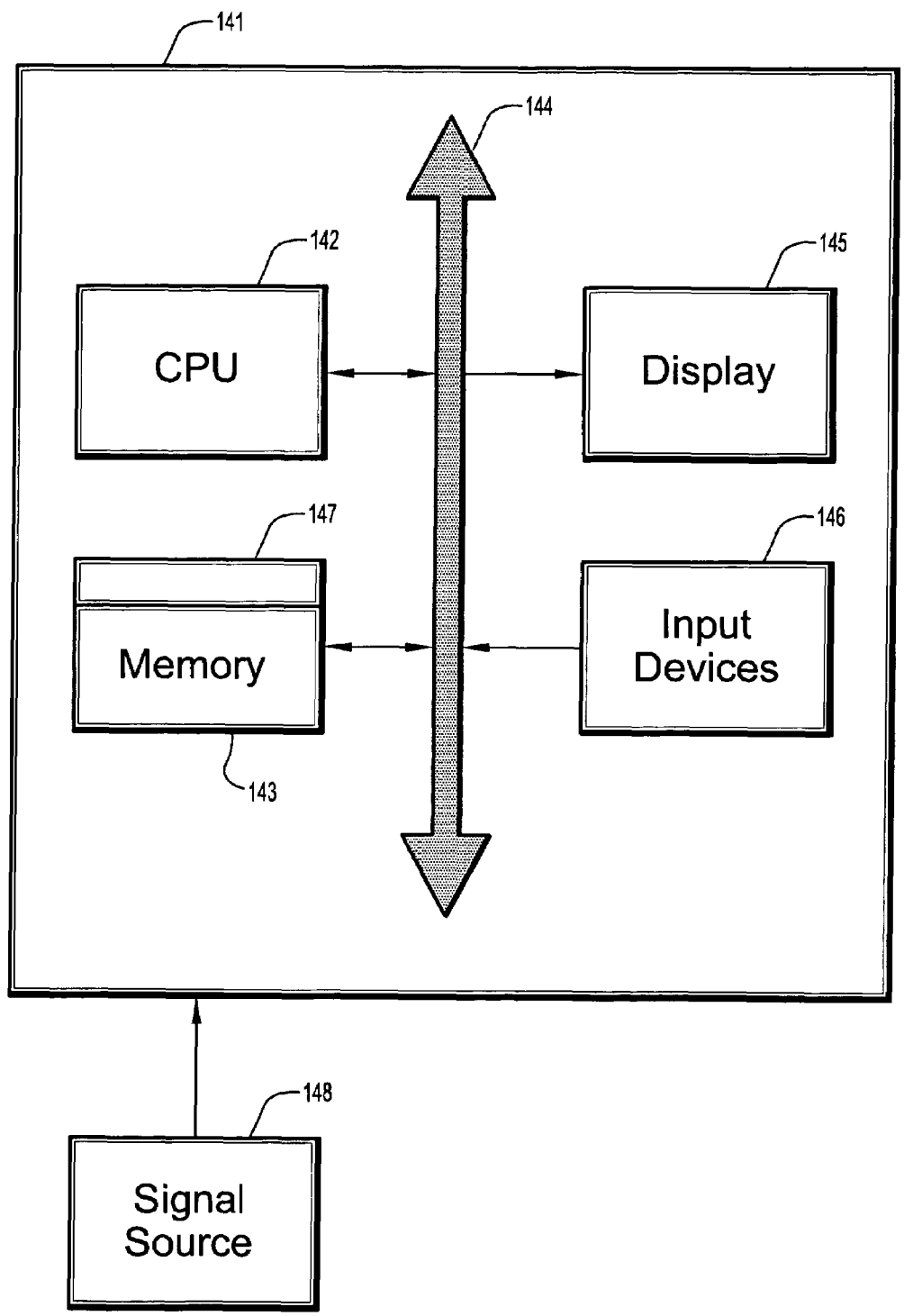
FIG. 14 is a block diagram of an exemplary computer system for implementing a method for detecting GGNs, according to an embodiment of the invention.

Referring now to FIG. 14, according to an embodiment of the present invention, a computer system 141 for implementing an embodiment of the present invention can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. An embodiment of the present invention can be implemented as one or more routines 147 that are stored in memory 143 and executed by the CPU 142, to process a signal from a signal source 148. As such, the computer system 141 is a general purpose computer system that becomes a specific purpose computer system when executing the routine(s) 147 of the present invention.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A program storage device readable by a computer, tangibly embodying a program of instructions executable by the computer to perform the method steps for detecting ground glass nodules in a digitized medical image, said method comprising the steps of:

providing a digital chest image comprising a plurality of intensities corresponding to a domain of points in a n-dimensional space;

calculating a probability distribution function of background lung tissue in said chest image based on a Markov random field model of said lung tissue;

estimating a variation range of said background tissue probability distribution function;

estimating a probability distribution function of an image point belonging to a ground glass nodule from said variation range of said background tissue probability distribution function by using a function corresponding to the variation range of the background tissue probability distribution function; and calculating a log likelihood function of said image from said background tissue probability distribution function and said estimated ground glass nodule probability distribution function, wherein said a log likelihood function represents the confidence that a point in said image is not part of a ground glass nodule.

2. The program storage device of claim 1, the method further comprising comparing said log likelihood function value for each point in said image to a confidence value of each point belonging to the background tissue, wherein a point is a candidate ground glass nodule location if its log likelihood function value is less than said confidence value.

3. The program storage device of claim 2, the method further comprising:

defining a 3D seed block about said candidate ground glass nodule location to initialize a foreground region;

calculating the average intensity of said seed block;

defining a new 3D block that is a neighbor of said foreground region, and calculating the average intensity of said new block; and adding said new block to said foreground region if the average intensity of said new block is close to the average intensity of said seed block.

4. The program storage device of claim 3, the method further comprising terminating the addition of new blocks to said foreground region if no neighboring blocks have an average intensity sufficiently close to the intensity of the seed block, and measuring the volume and compactness of said foreground region, wherein said candidate ground glass nodule contained in said foreground region is a false positive if either the volume of the foreground region is too large or the compactness of the foreground region is too small.

5. The program storage device of claim 2, wherein if said candidate ground glass nodule location is in a center of a 2D slice of said image, the method further comprises defining a 2D seed block about said candidate ground glass nodule location to initialize a foreground region;
   calculating the average intensity of said seed block;
   defining a new 2D block that is a neighbor of said foreground region, and calculating the average intensity of said new block; and
   adding said new block to said foreground region if the average intensity of said new block is close to the average intensity of said seed block.

6. The program storage device of claim 5, the method further comprising terminating the addition of new blocks to said foreground region if no neighboring blocks have an average intensity sufficiently close to the intensity of the seed block measuring the volume and compactness of said foreground region, wherein said candidate ground glass nodule contained in said foreground region is a false positive if either the volume of the foreground region is too large or the compactness of the foreground region is too small, and examining the 2 slices that neighbor the candidate ground glass nodule location slice, wherein said candidate ground glass nodule contained in said foreground region is a false positive if it has high intensity neighbors in either of the two neighboring slices.

7. The program storage device of claim 2, wherein if said candidate ground glass nodule location has a high contrast in its neighborhood, the method further comprises:
   providing a candidate volume of interest about said candidate ground glass nodule location;
   selecting a plurality of reference volumes of interest from said image, wherein each volume of interest is inside the lungs, the volumes are far apart, and wherein the average intensity of each volume of interest is a background level intensity;
   rescaling the intensities of each volume to be in a range from 0 to $I_{max}$, wherein $I_{max}$ is the same for each volume of interest;
   for each pair of adjoining voxels in each volume of interest, calculating an intensity co-occurrence matrix and a gradient co-occurrence matrix;
   calculating an inertia a contrast, and a correlation value from the intensity co-occurrence matrix for each volume of interest;
   calculating an inverse difference moment from said gradient co-occurrence matrix;
   determining the candidate volume of interest to contain a ground glass nodule its inertia, contrast, correlation and an inverse difference moment values are above threshold values determined from the reference volumes of interest.

8. The program storage device of claim 7, the method further comprising forming an intensity histogram for each volume of interest, and a gradient histogram for each volume of interest, wherein said intensity co-occurrence matrix is calculated form said intensity histogram, and said gradient co-occurrence matrix is calculated from said gradient histogram.

9. The program storage device of claim 2, the method further comprising:
   providing a seed point for the background and a seed point for an neighbor object of said candidate ground glass nodule;
   modeling a probability distribution function $\overline{\omega}^B$ for the background, a probability distribution function $\overline{\omega}^V$ for the neighbor object, and a probability distribution function $\overline{\omega}^C$ for the candidate ground glass nodule and determining a mean and variance for each distribution;
   computing an affinity map of each point with respect to each of the background seed, neighbor object seed, and candidate ground glass nodule seed, from an affinity function $A^O(b,c)$ that calculates the likelihood that a pair of points (b,c) belong to the same object O;
   defining a candidate set from those points whose affinity map value with respect to the candidate ground glass nodule is greater than the affinity map value with respect to the background; and
   defining a neighbor set from those points whose affinity map value with respect to the neighbor object is greater than the affinity map value with respect to the background.

10. The program storage device of claim 9, wherein if the candidate set and the neighbor set intersect, the method comprises using morphological operations to separate the candidate set form the neighbor set.

11. The program storage device of claim 9, wherein the background seed point is a point with a minimum intensity, and the neighbor object seed point is selected from a point in a neighborhood of the candidate ground glass nodule with a maximum intensity.

12. The program storage device method of claim 9, the method further comprising applying a band pass filter to the image, wherein noise and intensity variations across the image are reduced.

13. The program storage device of claim 12, wherein the band pass filter is represented by $$H(u)=(1-e^{(u_x^2+u_y^2)/(2\sigma_d^2)})e^{(u_x^2+u_y^2)/(2\sigma_d^2)},$$

wherein $u_x$ and $u_y$ are the x- and y-components of the frequency u, and $\sigma_d$ is the width of the filter.

14. The pro am storage device of claim 9, wherein the mean and variance of the background, neighbor object and candidate ground glass nodule are determined by dividing the intensity range of the image into 3 sub-ranges, a low intensity range, a mid-intensity range, and a high intensity range, and computing a mean and variance of each sub-range, wherein the mean and variance of the low intensity range corresponds to the background, the mean and variance of the mid-intensity range corresponds to the candidate ground glass nodule, and the mean and variance of the high intensity range corresponds to the neighbor object.

15. The program storage device of claim 9, wherein the probability distribution function of the candidate ground glass nodule is represented by $$\overline{\omega}^C(x) = e^{\frac{(I(x)-m_C)^2}{2\sigma_C^2}},$$

wherein I(x) is the intensity at point x, $m_c$ is the mean ground glass nodule intensity and $\sigma_c$ is its variance, the probability distribution function of the background is represented by $$\varpi^B(x) = \begin{cases} e^{\frac{(I(x)-m_B)^2}{2\sigma_B^2}}, & \text{if } I(x) > m_B, \\ 1, & \text{otherwise} \end{cases}$$

wherein $m_B$ is the mean background intensity and $\sigma_B$ is its variance, and the probability distribution function of the neighbor object is represented by $$\varpi^V(x) = \begin{cases} e^{\frac{(I(x)-m_V)^2}{2\sigma_V^2}}, & \text{if } I(x) > m_V, \\ 1, & \text{otherwise} \end{cases}$$

wherein $m_V$ is the mean neighbor object intensity and $\sigma_V$ is its variance.

16. The program storage device of claim 9, wherein aid affinity function $A^O(b,c)$ that calculates the likelihood that a pair of points (b,c) belong to the same object O is represented by $$A^O(b,c) = \sqrt{\Psi(b,c)\phi^O(b,c)}$$

wherein $\Psi(.,.)$ denotes a global component represented by $$\Psi(b,c) = e^{\frac{(I(b)-I(c))^2}{2\sigma_d^2}},$$

wherein I(b) and I(c) are the intensities of the two points (b,c), and $\phi(.,.)$ denotes a local component, wherein the local component two point b and c belonging to the candidate ground glass nodule is represented by $$\varphi^C(b,c) = \frac{\min\{\varpi^C(b), \varpi^C(c)\}}{\min\{\varpi^C(b), \varpi^C(c)\} + \max\{\varpi^B(b), \varpi^B(c)\} + \max\{\varpi^V(b), \varpi^V(c)\}},$$

wherein the local component of these two points belonging to the background and the neighbor object can be obtained by permutation of the labels C, B, and V.

17. The program storage device of claim 9, wherein the affinity map for each of the background, the candidate ground glass nodule, and the neighbor object are computed by initializing the affinity map value M(c) of the respective seed point c to be 1, searching the neighbors of the seed point for a point d that has a maximum affinity function with respect to the seed point, updating the map value M(d) of d according to $M(d)=\min\{M(c), A^O(c,d)\}$, and recursively propagating affinity map values to the other points in the image.

18. The program storage device of claim 1, the method further comprising segmenting the image and selecting the subset of image domain points corresponding to the lungs.

19. The program storage device of claim 1, wherein the log likelihood function L(s) is represented by $L(s)=\log(P(X_s|X_{N(s)},c_0))-H(\log(P(X_s|X_{N(s)},c_0)))$, $s \in S$, wherein the function H( ) represents a unction corresponding to the variation range of the background tissue probability distribution function, $P(X_s|X_{N(s)},c_0)$, $s \in S$ represents the probability distribution function of background lung tissue, wherein s is a point in the domain of image S, $X_s$ is a random field that maps the points s to a set of greyscale intensities, $X_{N(s)}$ is a random field that maps points in a neighborhood N(s) of a point to the set of greyscale intensities, and $c_0$ is a parameter of the Markov random field model that characterizes the background tissue.

20. The program storage device of claim 19, wherein the function corresponding to the variation range of the background tissue probability distribution function corresponds to $P(X_s|X_{N(s)},c_0)$ at an upper confidence level.

21. The program storage device of claim 19, wherein the function corresponding to the variation range of the background tissue probability distribution function corresponds to a mean function of $P(X_s|X_{N(s)},c_0)$.

22. A program storage device readable by a computer, tangibly embodying a program of instructions executable by the computer to perform the method steps for detecting ground glass nodules in a digitized medical image, aid method comprising the steps of:
providing a digital chest image comprising a plurality of intensities corresponding to a domain of points in a n-dimensional space;
calculating a probability distribution function of background lung tissue in said chest image based on a Markov random field model of said lung tissue;
estimating a probability distribution function of an image point belonging to a ground glass nodule from either a mean function of the background tissue probability distribution function or a function corresponding to an upper confidence level of said background tissue probability distribution function; and
calculating a log likelihood function of said image from said background tissue probability distribution function and said estimated ground glass nodule probability distribution function wherein said a log likelihood function represents the confidence that a point in said image is not part of a ground glass nodule.

23. The program storage device of claim 22, the method further comprising estimating a variation range of said background tissue probability distribution function, and using said variation range to estimate said mean function of the background tissue probability distribution function and said function corresponding to an upper confidence level of said background tissue probability distribution function.

* * * * *